United States Patent [19]

Mancabelli

[11] Patent Number: 4,627,155
[45] Date of Patent: Dec. 9, 1986

[54] TUBE EXTRACTING APPARATUS

[75] Inventor: Robert C. Mancabelli, Syracuse, N.Y.

[73] Assignee: Carrier Corporation, Syracuse, N.Y.

[21] Appl. No.: 752,770

[22] Filed: Jul. 8, 1985

[51] Int. Cl.⁴ .................. B23P 15/26; B23P 19/00
[52] U.S. Cl. ............................. 29/726; 29/252;
29/265; 29/282; 29/283; 29/426.1; 29/426.5
[58] Field of Search .............. 29/252, 265, 282, 283,
29/426.1, 426.5, 726, 727

[56] References Cited

U.S. PATENT DOCUMENTS

| | | | |
|---|---|---|---|
| 1,596,464 | 8/1926 | Smith | 29/282 |
| 1,964,023 | 6/1934 | Armstrong | 29/252 |
| 2,697,872 | 12/1954 | Armstrong | 29/252 |
| 3,052,973 | 9/1962 | Williams | 29/426.5 X |
| 3,367,011 | 2/1968 | Sipher | 29/726 |
| 3,369,287 | 2/1968 | Brochetti | 29/252 |
| 3,787,950 | 1/1974 | Bagby | 29/282 X |
| 3,791,011 | 2/1974 | Keys | 29/252 |
| 3,925,874 | 12/1975 | Moyers | 29/726 X |
| 4,000,556 | 1/1977 | Ciminero | 29/282 X |
| 4,074,410 | 2/1978 | Jarm | 29/265 |
| 4,077,102 | 3/1978 | Smith | 29/252 |
| 4,104,775 | 8/1978 | Lawless | 29/265 |
| 4,125,928 | 11/1978 | Cawley et al. | 29/282 |
| 4,214,362 | 7/1980 | Beard | 29/726 |
| 4,283,826 | 8/1981 | Miller | 29/252 |
| 4,369,569 | 1/1983 | Armstrong, Jr. et al. | 29/726 |
| 4,492,327 | 1/1985 | Martin | 226/177 |

Primary Examiner—Howard N. Goldberg
Assistant Examiner—R. S. Wallace
Attorney, Agent, or Firm—Douglas L. Miller

[57] ABSTRACT

A tube extracting apparatus is provided for extracting tubes from structures, such as condensers, evaporators, and the like. The apparatus is compact and relatively lightweight and thus easy to maneuver in confined spaces to extract a tube. The apparatus generally comprises a housing assembly housing a reciprocative pull shaft to which is connected a gripping assembly for gripping the tube. A retention assembly is provided for momentarily retaining a portion of the gripping assembly in place during the initial reciprocative movement to ensure the gripping assembly securely grips the tube, and a unidirectional check assembly is provided to prevent the tube from being pushed back into the structure during the reciprocating movement.

20 Claims, 14 Drawing Figures

TUBE EXTRACTING APPARATUS

BACKGROUND OF THE INVENTION

This invention pertains to a tube extracting apparatus, and more particularly to an improved tube extracting apparatus for extracting tubes from different types of structures, such as condensers, evaporators, and the like.

For example, a typical condenser generally comprises a pair of parallel tube sheets, a plurality of baffle plates, and a plurality of heat exchange tubes The tube sheets are located at the ends of the condenser, and the baffle plates are positioned between the tube sheets and generally parallel thereto. The heat exchange tubes extend between the tube sheets and through the baffle plates, and are supported by the tube sheets The tube sheets and baffle plates have a series of aligned holes formed therein, and the heat exchange tubes are inserted through these holes and then expanded in the areas of the tube sheets into fluid-tight pressure contact therewith.

Because of malfunctions or normal preventive maintenance, it may be necessary to remove one or all of the tubes from the structure, and this is generally accomplished by first relieving the pressure forces between the tubes and the tube sheets and then longitudinally pulling the tubes through the baffle plates and the tube sheets. Various types of devices are used to initially relieve or break the secure connection between the tubes and tube sheets, and then another apparatus is used to withdraw the tubes from the structure. Generally, these latter apparatuses for withdrawing the tubes are hydraulic jacks, which are slow and require the operator to attach, unattach and then reattach the jack to the tube as it is being withdrawn; or pneumatic devices which are relatively large and heavy, and thus difficult to use in the generally confined spaces containing the various types of structures described above. Another means for withdrawing the tubes from the structure is by manually pulling the tubes through the baffle plates and tube sheets. Naturally, this is a difficult and time consuming task, particularly since the tubes in some cases may have lengths of up to seventy feet and be of considerable weight.

In some cases, the structure, such as a condenser, includes oppositely disposed waterboxes having relatively long depths from which the tubes must be extracted. In these cases, it can be very difficult to maneuver the prior art tube pulling devices into the waterbox to initially grasp and then withdraw the tube. This problem becomes particularly acute if the initial apparatus used for breaking the connection between the tubes and tube sheets does not initially pull the tube far enough from the tube sheet.

SUMMARY OF THE INVENTION

It is an object of the present invention to provide an improved tube extracting apparatus for extracting tubes from various types of structures, such as condensers, evaporators, and the like.

Another object of the present invention is to provide a tube extracting apparatus that is compact and lightweight, and thus easy to manipulate or maneuver in confined spaces.

Yet another object of the present invention is to provide a tube extracting apparatus that can easily reach into waterboxes having relatively great depths to extract tubes therefrom.

A further object of the present invention is to provide a tube extracting apparatus that can initially grip and extract tubes that extend a relatively short distance from a vessel wall.

Further objects of the present invention will appear as the description proceeds.

In one form of the present invention, there is provided a tube extracting apparatus comprising a pull shaft having opposite end portions and being reciprocative between an extended position and a retracted position; a compression member connected to one of the end portions of the shaft for reciprocative movement therewith: and a collet member disposed with the compression member for reciprocative movement therewith between the extended and retracted positions. The collet member has an engageable gripping means for gripping radially inwardly when engaged, and the compression member includes a compressing means generally peripherally disposed about the gripping means for compressively engaging the gripping means when moving from the extended position to the retracted position and for disengaging the gripping means when moving from the retracted position to the extended position.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF A PREFERRED EMBODIMENT

Figure 1:
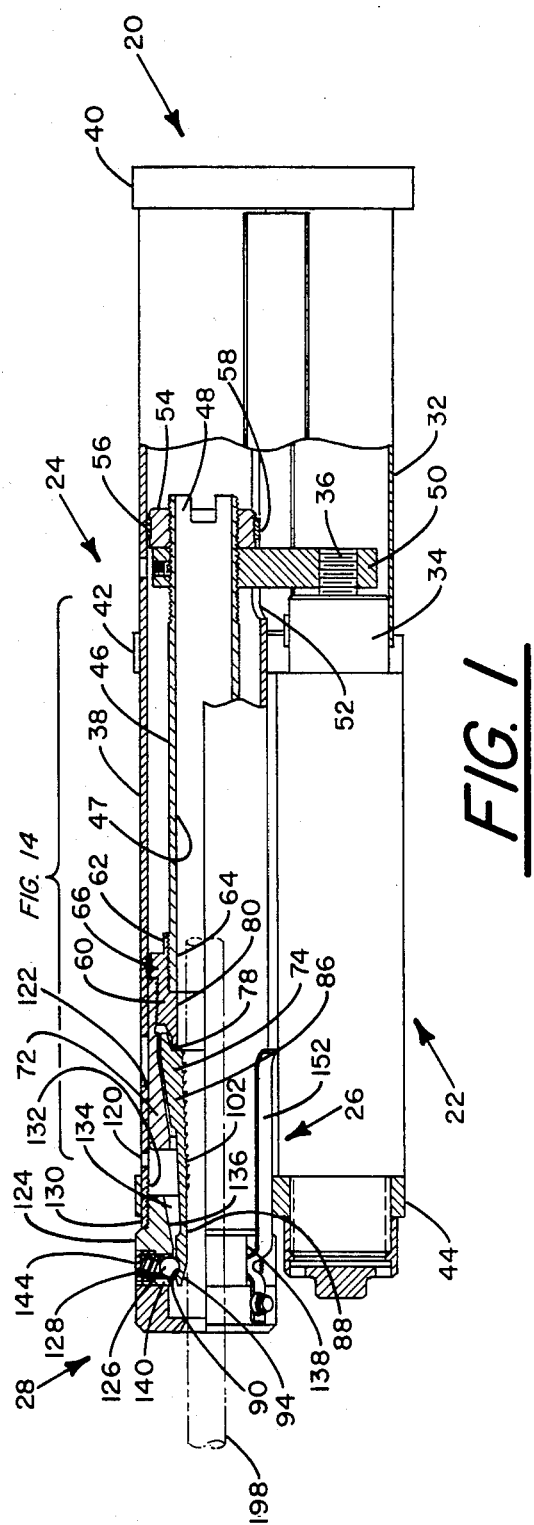
FIG. 1 is a side elevational view partially broken away and partially in cross section of a preferred embodiment of the present invention illustrating the extended position.
Figure 3:
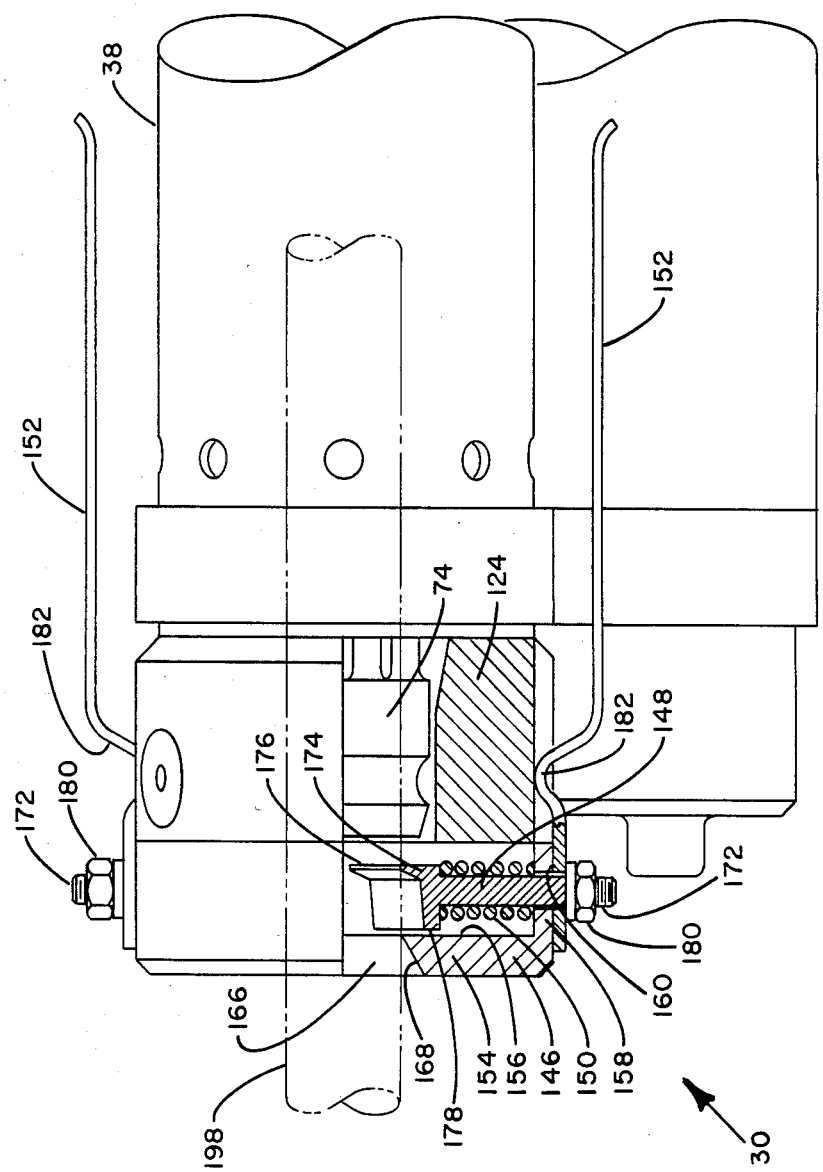
FIG. 3 is a fragmentary sectional view of FIG. 2 taken along line III—III and viewed in the direction of the arrows.
Figure 14:
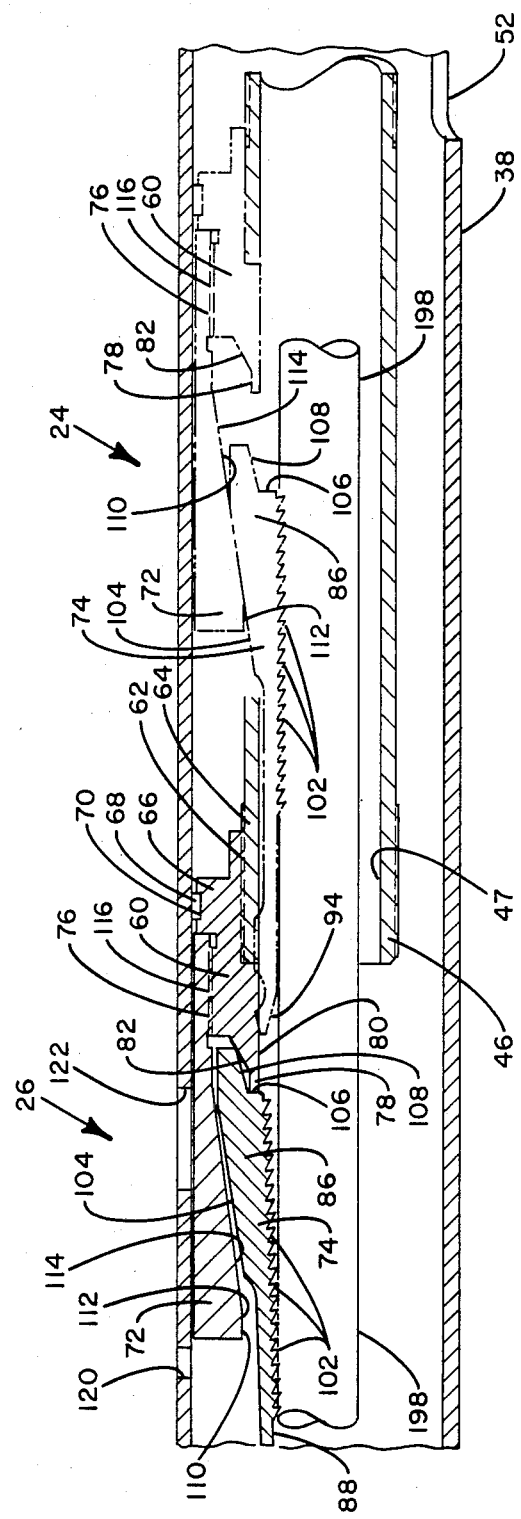
FIG. 14 is a partial side elevational view of FIG. 1 illustrating both the extended and retracted positions.

Referring primarily to FIGS. 1, 3 and 14, there is illustrated tube extracting apparatus 20 comprising in major part a hydraulically operated two-way power cylinder assembly 22, housing assembly 24, gripping assembly 26, retention assembly 28, and tube-check assembly 30. Housing assembly 24 contains therein or has attached thereto gripping assembly 26, retention assembly 28, and tube-check assembly 30.

Power cylinder assembly 22 comprises a cylinder 32 slidably containing therein a reciprocative piston or ram 34 having an axially extending threaded shaft 36. Power cylinder assembly 22 further includes a remotely electrically actuated and hydraulically operated control system (not shown) that provides a continuous push-pull reciprocating movement to ram 34 and its threaded shaft 36, and is designed to provide about three thousand five hundred (3,500) pounds of pull.

Housing assembly 24 comprises outer puller housing 38, and is securely connected to cylinder 32 by three clamps 40, 42, 44, which can be removable from housing 38 and cylinder 32 to allow disassembly thereof.

Pull shaft 46, which has passage 47 extending therethrough, is slidably received in housing 38 and is supported at pull shaft end 48 by connecting link 50. Connecting link 50 is reciprocatively received in housing slot 52 of housing 38 and is threadedly engaged with pull shaft end 48. Connecting link 50 further includes bearing portion 54, which is in sliding engagement with the inner surface of housing 38 and is sealed therewith by a wear ring 56 seated in a complementary-shaped annular groove 58. Connecting link 50 is threadedly engaged with threaded shaft 36 of ram 34, thereby to provide reciprocating motion to pull shaft 46.

Figure 5:
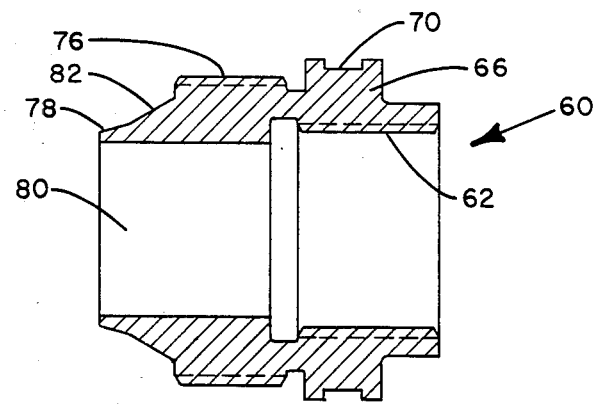
FIG. 5 is a sectional view of a pull collar in the embodiment in FIG. 1.

Referring to FIGS. 1, 14 and 5, pull collar 60 is illustrated having a threaded inner surface 62 for threadedly engaging threaded pull shaft end 64. Pull collar 60 includes annular portion 66 in sliding engagement with the inner surface of housing 38 and having a wear ring 68 seated in complementary-shaped groove 70. Both wear rings 56 and 68 are in sliding engagement with the inner surface of housing 38. As illustrated in FIG. 14, pull collar 60, compression sleeve 72, and compression collet 74 are in an extended position, and are shown in a retracted position in dashed lines. Movement between the extended and retracted positions will be described in greater detail below.

Continuing to refer to FIGS. 1, 14 and 5, pull collar 60 also includes a threaded outer surface 76 radially spaced-apart from the inner surface of housing 38, and an annular collet release flange 78 extending axially therefrom. Pull collar 60 further includes a bore 80 axially disposed therein.

Collet release flange 78 of pull collar 60 extends axially outwardly from a tapering surface 82 that tapers radially inwardly from threaded surface 76. The function of collet release flange 78 and tapering surface 82 will be described in greater detail below.

Referring now to FIGS. 1, 14, 6, and 7, compression collet 74 is generally cylindrical in shape and includes front annular portion 84, six gripping legs 86 extending axially therefrom, and collet passage 88 disposed therethrough. Front annular portion 84 has groove 90 annularly disposed in its radially outer surface, and upper tapering surface 92 and lower tapering surface 94 extend axially therefrom.

The six gripping legs 86 are in peripheral alignment about the axis of housing 38, and each has a first section 96 generally parallel to the axis of housing 38, a second section 98 extending axially and radially outwardly therefrom, and a remote third section 100 extending axially therefrom and generally parallel to first section 96. Each leg 86 includes on its radially inner surface an arrangement of gripping teeth 102 that are backwardly inclined away from front annular portion 84. Teeth 102 extend along the inner surfaces of sections 96, 98, and 100. Each second section 98 of a leg 86 has an engageable surface 104 facing radially outwardly and sloping radially outwardly in a direction away from front annular portion 84. Each third section 100 of a leg 86 includes a collet shoulder 106 and a radially inwardly facing tapering surface 108.

Figure 7:
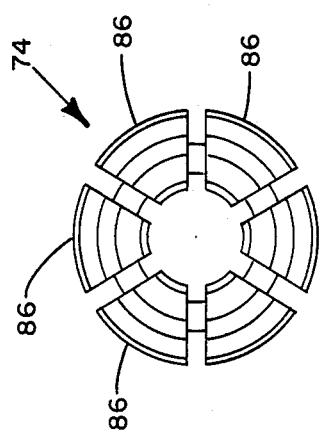
FIG. 7 is an end elevational view of the compression collet in FIG. 6.
Figure 6:
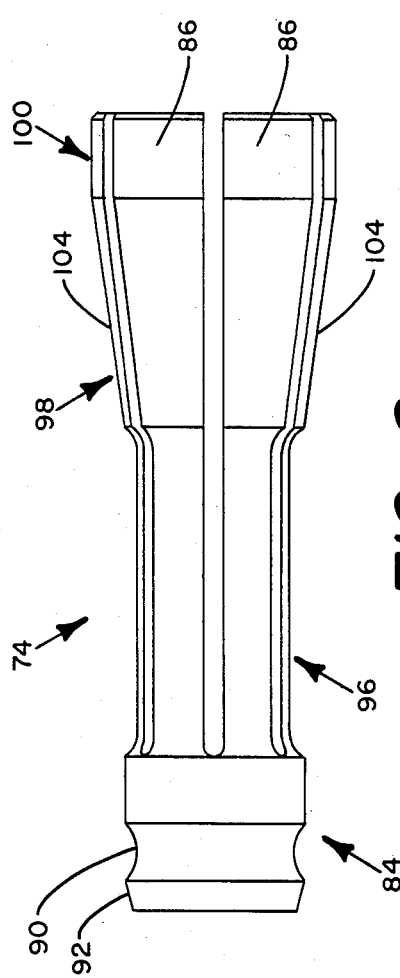
FIG. 6 is a side elevational view of a compression collet in the embodiment in FIG. 1.

When compression collet 74 is initially formed, the radially inner surfaces of each leg 86 are generally parallel to the axis of housing 38 as illustrated in dashed lines in FIG. 14. After legs 86 are formed, heat is applied generally at each first section 96 to permit bending of each leg 86 by a predetermined amount, thereby increasing the diameter of collet passage 88 at that point. Thereafter, legs 86 are hardened and then quenched in oil. The final state or form of compression collet 74 is then as illustrated in FIGS. 1, 6, and 7. Thus, after legs 86 have been forced radially inwardly and then released, they will spring radially outwardly due to their elastic property.

Compression collet 74 is made of a material having very high elastic limits, such as an AISI S-5 tool steel or other suitable material. This type of material also has high shock resistance, low carbon content for increased toughness and durability, good ductility, and high wear resistance. The S-5 tool steel is essentially silicon manganese The S-5 material, as indicated above, is heat treated to a hardness factor of about Rc 58-60.

Compression collet 74 is slidably received within housing 38 with collet release shoulder 106 abutting collet release flange 78 of pull collar 60 and with tapering surfaces 108 generally in mutually facing relationship with tapering surface 82 of pull collar 60.

Figure 8:
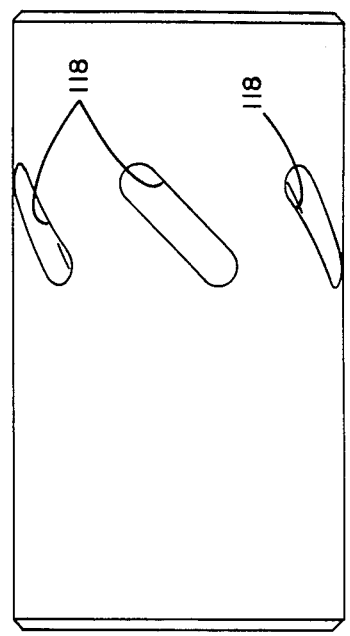
FIG. 8 is a side elevational view of a compression sleeve in the embodiment in FIG. 1.

Referring to FIGS. 1, 14 and 8, compression sleeve 72 is slidably received in housing 38 and has a generally cylindrical outer surface in sliding engagement with the inner surface of housing 38. Compression sleeve 72 has a sleeve bore 110 which includes a first generally cylindrical surface portion 112 generally parallel to the longitudinal axis of housing 38, a compressing surface 114 facing radially inwardly and tapering radially outwardly in a direction away from first surface portion 112, and a remote threaded surface portion 116.

Upon slidably receiving compression sleeve 72 in housing 38, its remote threaded surface portion 116 is threadedly engaged with threaded surface 76 of pull collar 60. Thus, radially inwardly facing compressing surface 114 of compression sleeve 72 is in generally mutually facing relationship with radially outwardly facing engageable surface 104 of compression collet 74, as indicated in FIGS. 1 and 14. Further, compression collet 74 is loosely held in position by pull collar 60 and compressing surface 114 of compression sleeve 72. Compression sleeve 72 also includes slots 118 disposed therein which can be aligned with housing holes 120 in housing 38 or housing slots 122 in housing 38. By aligning these holes, a blast of air can be directed through either aligned slots 118 and holes 120 or aligned slots 118 and slots 122 to allow cleaning of sleeve bore 110.

Further, as illustrated in FIG. 1, air delivered through housing holes 120 can be directed against compression collet 74 for the cleaning thereof.

As thus described above, compression sleeve 72 and compression collet 74 generally comprise gripping assembly 26.

Figure 9:
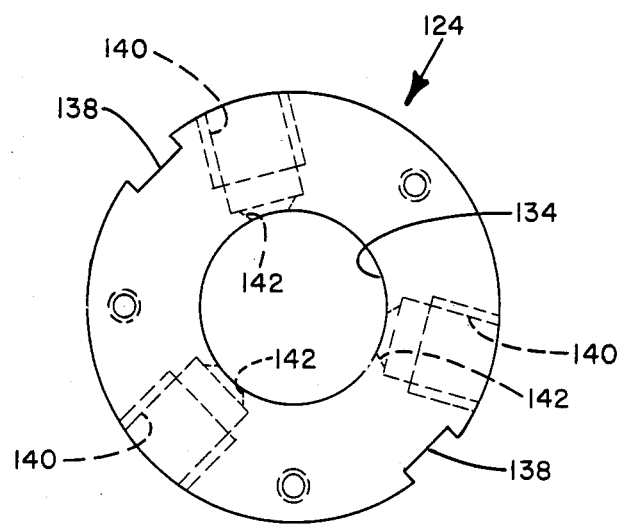
FIG. 9 is an end elevational view of a retainer housing in the embodiment in FIG. 1.

Referring now to FIGS. 1 and 9, a description of retention assembly 28 will be made. Assembly 28 comprises retainer housing 124, three spherical balls 126 (only one shown), and three compression springs 128 (only one shown). Retainer housing 124 includes a threaded outer surface portion 130 for threadedly engaging inner threaded surface portion 132 of housing 38. Retainer housing 124 further includes a central bore 134 extending axially therethrough and having a tapered surface portion 136 that tapers radially outwardly in a direction toward gripping assembly 26. Retainer housing 124 also includes a pair of diametrically opposed grooves 138 longitudinally disposed in its outer surface at the ten o'clock and four o'clock positions as indicated in FIG. 9, and three openings 140 radially disposed therein, wherein the radially inner end of each opening 140 converges inwardly to form a smaller opening 142. Each opening 140 is equally spaced peripherally from adjacent openings 140 and has a diameter greater than the diameter of a ball 126; the diameters of openings 142 being less than the diameters of balls 126. Disposed in each opening 140 is a respective compression spring 128 maintained therein by a respective cap 144 that is threadedly engaged with its respective opening 140. Compression springs 128 bias respective balls 126 radially inwardly against openings 142, wherein balls 126 are received in complementary-shaped groove 90 of compression collet 74, as illustrated in FIG. 1. Each compression spring 128 has a spring rate of about 100 pounds per inch, and the three compression springs 128 acting against respective balls 126 cause balls 126 to apply a total gripping force of about 75 pounds against collet groove 90 of compression collet 74, the purpose of which will be described hereinafter.

Figures 10, 11:
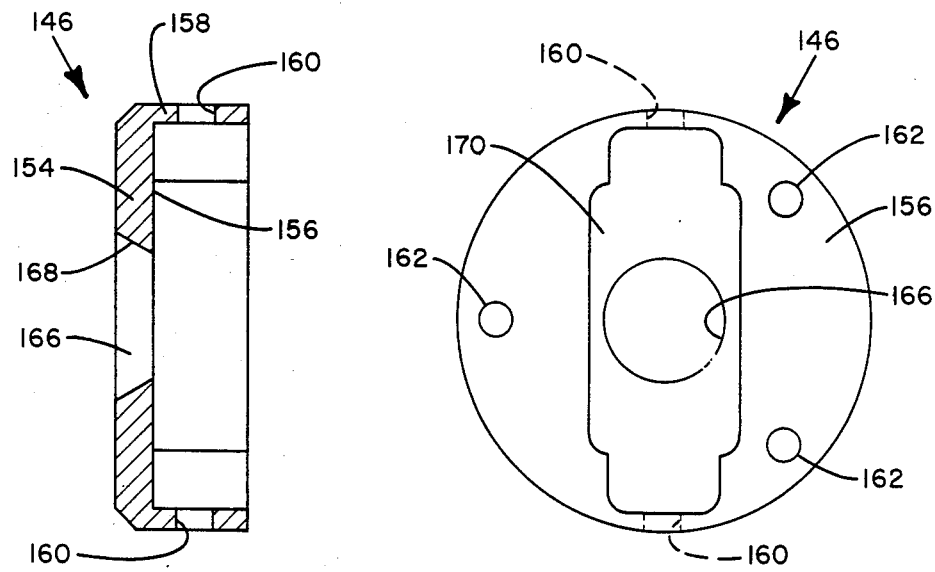
FIG. 10 is a sectional view of a nose piece in the embodiment in FIG. 1.
FIG. 11 is an end elevational view of the nose piece in FIG. 10.

Referring now to FIGS. 1, 2, 3, 10-13, tube-check assembly 30 comprises nose piece 146, two pawls 148, two compression springs 150, and two pawl release levers 152. Nose piece 146 includes a front wall 154 having an inner surface 156, and an annular wall 158 having two diametrically opposed openings 160 which align with respective grooves 138 in retainer housing 124 when nose piece 146 is attached thereto. Nose piece 146 includes three mounting holes 162 (FIG. 2) for receiving respective mounting screws 164 therethrough. Mounting screws 164 are threadedly secured in respective openings (not shown) in retainer housing 124. Nose piece 146 further includes a central opening 166 disposed in front wall 154 and has a tapering surface 168 that tapers radially inwardly toward annular wall 158. The inner surface 156 includes a generally rectangular recess 170 encompassing central opening 166, as illustrated in FIG. 11.

Figure 12:
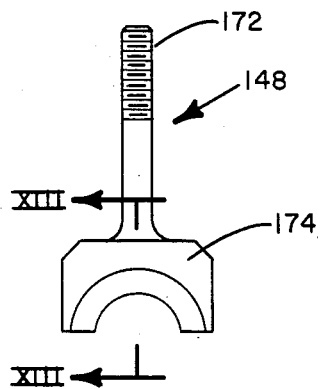
FIG. 12 is a front elevational view of a pawl in the embodiment in FIG. 1.
Figure 13:
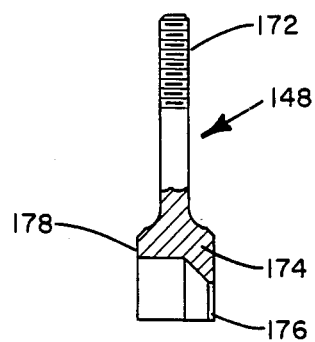
FIG. 13 is a side elevational view of the pawl in FIG. 12.

Referring specifically to FIGS. 12 and 13, each pawl 148 includes a threaded end 172 that is received through a respective opening 160 in annular wall 158. Each pawl 148 further includes integrally therewith a generally semi-circular one-way check segment 174 having a tapering biting edge 176 and a guide edge 178. The guide edge 178 of each pawl 148 is slidably received in recess 170 of nose piece 146 on its respective side of opening 166. Each pawl 148 has a respective compression spring 150 disposed between check segment 174 and annular wall 158 for biasing a respective pawl 148 radially inwardly. Each pawl threaded end 172 extends through a respective opening 160 outwardly from annular wall 158 and is received through an opening (not shown) in a respective pawl release lever 152. The remote ends of each check segment 174 of a respective pawl 148 abut each other in a surrounding fashion about central opening 166. A nut 180 is threadedly received on each threaded end 172. As can be seen in FIG. 3, each pawl release lever 152 has a curved portion 182 that is curved radially inwardly and is received in a respective groove 138 in retainer housing 124. By squeezing the levers 152 radially inwardly, a pivot action is caused by curved portions 182 against nuts 180 to thereby move pawls 148 radially outwardly against their respective compression springs 150, which may be the same type of springs as compression springs 128.

Figure 4:
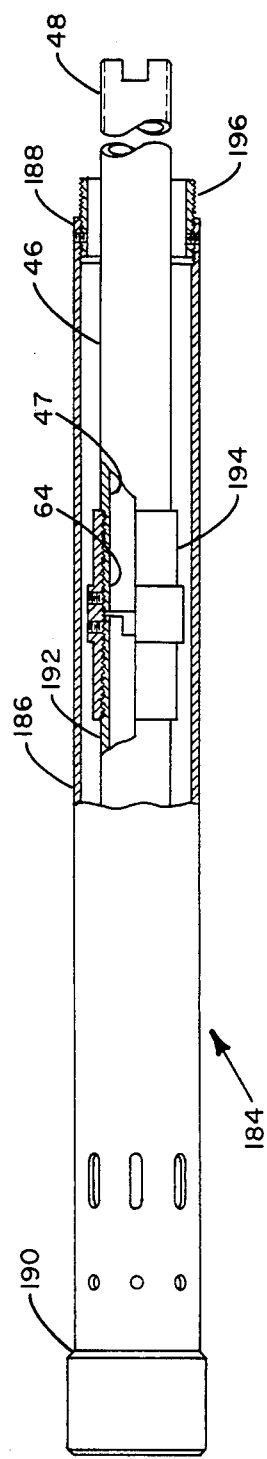
FIG. 4 is a side elevational view partially broken away and partially in cross section of an extension assembly of the embodiment in FIG. 1.
Figure 2:
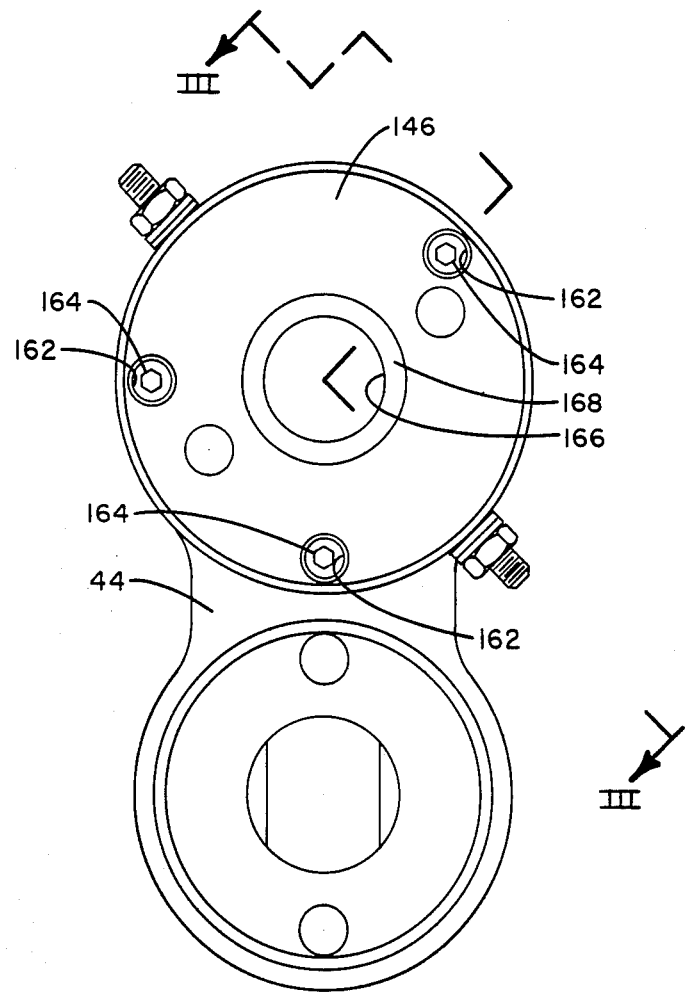
FIG. 2 is a front end elevational view of the embodiment in FIG. 1.

Referring to FIG. 4, extension assembly 184 can be interconnected between housing assembly 24 and gripping assembly 26 to permit gripping assembly 26 to span the distance between the open remote end of a waterbox (not shown) and a tube sheet (not shown) through which a tube to be extracted extends. Extension assembly 184 includes extension housing 186 having opposite open ends 188, 190; pull shaft 162; coupler 194; and housing connector 196. Housing connector 196 is threaded on its outer surface, and coupler 194 is threaded on its inner surface. Extension assembly 184 is interconnected by removing mounting screws 164 from nose piece 146 and removing nose piece 146; threadedly removing retainer housing 124 from outer puller housing 38; threadedly removing together compression sleeve 72 and pull collar 60 from pull shaft 46; removing compression collet 74 with compression sleeve 72 and pull collar 60 from housing 38; and then threading coupler 194 to the ends of pull shafts 46, 162 as illustrated in FIG. 4. Thereafter, housing connector 196 is threaded to housing 38; pull collar 60 with compression sleeve 72 and compression collet 74 is threaded onto the remote end of pull shaft 162; extension housing 186 is received over compression sleeve 72 and pull collar 60, and housing 186 is then threaded onto housing connector 196. Thereafter, retainer housing 124 is threadedly received on open end 190 of extension housing 186 and nose piece 146 is secured to retainer housing 124 by mounting screws 164. Thus, extension assembly 184 permits gripping assembly 26 to reach further into a waterbox to grip and extract a tube therefrom while permitting power cylinder assembly 22 and housing assembly 24 to remain outside of the waterbox.

The diameters of pull shaft passage 47, pull collar bore 80, collet passage 88, compression sleeve bore 110, retainer housing central bore 134, and nose piece central opening 166 are greater than the diameters of the tubes to be extracted by tube extracting apparatus 20 of the present invention, as is the diameter of the opening formed by pawls 148 when engaged together.

In operation, the operator manually inserts the remote end of a tube 198 into central opening 166 of nose piece 146. The tapering surface 168 of central opening 166 helps to guide the remote end of tube 198 into central opening 166 and initially into collet passage 88, such that the remote end of tube 198 is at least just slightly within first section 96 of collet 74. Thereafter, the serviceman can move away from tube extracting apparatus 20 to remotely operate power cylinder assembly 22. Upon operation of power cylinder assembly 22, ram 34 is moved in a reciprocating manner in cylinder 32, thereby causing pull shaft 46 to likewise reciprocate by means of connecting link 50. When moving from the extended position, shown in solid lines, to the retracted position, shown in dashed lines, pull shaft 46 moves pull collar 60 and compression sleeve 72 from left to right, thus causing compressing surface 114 of compression sleeve 172 to contact engageable surface 104 of compression collet 74. As movement is continued from left to right, the compressing action of compressing surface 114 against engageable surface 104 causes collet gripping legs 86 to be forcibly moved radially inwardly, thus causing some of the gripping teeth 102 to come into gripping contact with the external surface of tube 198. Compression collet 74 is initially maintained in its axial position during the compressing action of compressing surface 114 against engageable surface 104 by the gripping force of balls 126 in collet groove 90, thereby to ensure teeth 102 have firmly gripped tube 198. After further movement from left to right of compression sleeve 72 against compression collet 74, the gripping force of balls 126 is overcome and compression collet 74 with tube 198 secured therein begins to move from the extended to the retracted position, indicated in dashed lines in FIG. 14. FIGS. 1 and 14 do not show pull shaft 46 as moving from the extended to the retracted position, but naturally would be moved in a direction of left to right as viewed in FIG. 1 as connecting link 50 moves to the right under the influence of ram 34.

After reaching the retracted position, pull shaft 46 is then moved back to the extended position by power cylinder assembly 22. This movement from right to left, as viewed in FIG. 14, will move compressing surface 114 out of engagement with engageable surface 104, but teeth 102 may remain embedded in tube 198. Teeth 102 are forced out of engagement with tube 198 by a wedging action caused by the impact between collet release flange 78 of pull collar 60 and collet shoulder 106 of compression collet 74. Initially, collet release flange 18 forcibly impacts against tapering surface 108 of each leg 86 to thereby cause each leg 86 to begin moving radially outwardly away from tube 198 to withdraw teeth 102 therefrom. Further movement right to left causes collet release flange 78 to impact against collet shoulder 106 to thereby fully withdraw teeth 102 from tube 198 and to allow legs 86 to elastically spring radially outwardly to their position indicated in solid lines at the extended position. As compression collet 74 continues to move from right to left in FIG. 1, it is guided towards balls 126 by means of tapered surface portion 136 of retainer housing 124 and upper tapering surface 92 of compression collet 74. Upon reaching balls 126, upper tapering portion 92 contacts balls 126 to move them radially outwardly against the spring force of compression springs 128 until balls 126 are received in collet groove 90.

During this movement from the retracted position to the extended position, tube 198 is prevented from moving from right to left by the action of tube-check assembly 30. Upon initially inserting tube 198 through nose piece 146, the remote end of tube 198 contacts the tapering biting edge 176 of each pawl 148 to cause pawls 148 to move radially outwardly. Only the side of biting edge 176 that faces toward tube 198 is inclined, as illustrated in FIG. 13, so that tube 198 slides therealong in a camming-type action to move pawls 148 radially outwardly. Movement in the opposite direction, i.e., right to left is prevented by the biting action of biting edge 176 against tube 198 under the combined influence or force of compression springs 150 and a slight pendulum action of each pawl 148. The pivoting of the pendulum action occurs at the point where each pawl threaded end 172 is received through a respective opening 160. The combination of this pendulum or pivoting action of each pawl 148 and the biting action of each biting edge 176 against tube 198, causes a binding force to grip tube 198 to prevent it from moving from right to left as viewed in FIG. 1.

Upon reaching the extended position, movement to the retracted position is again repeated until tube 198 is fully retracted and passes through the opposite open end of outer puller housing 38.

During the pulling action of tube extracting apparatus 20, it is maintained in abutting engagement against the structure, such as a tube sheet, by the naturally occurring force that is opposite and equal to the extracting force. For ease of operation and maneuvering, tube extracting apparatus 20 is supported by two nylon straps connected to a cable secured to an overhead support (not shown). By thus supporting tube extracting apparatus 20, it can be easily maneuvered manually by a serviceman.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice to the art to which this invention pertains and fall within the limits of the appended claims.

What is claimed is:

1. A tube extracting apparatus, comprising:
   a pull shaft having opposite end portions and being reciprocative between an extended position and a retracted position,
   a compression member being connected to one of said end portions of said pull shaft for reciprocative movement therewith between said extended and said retracted positions, and
   a collet member being disposed with said compression member for reciprocative movement therewith between said extended and said retracted positions, and having an engageable gripping means for gripping radially inwardly when engaged,
   said compression member having a compressing means generally peripherally disposed about said gripping means for compressively engaging said gripping means when moving from said extended position to said retracted position and for disengaging said gripping means when moving from said retracted position to said extended position, whereby a tube inserted in said gripping means is continuously extracted by the reciprocative movement of said gripping means from said extended position to said retracted position wherein said compressing means compresses said gripping means against the tube, and from said retracted position to said extended position wherein said compressing means disengages from said gripping means.

2. The apparatus of claim 1 wherein said compressing means includes a radially inwardly facing surface, and said gripping means includes a radially outwardly facing surface, said surfaces being in generally mutually facing relation, one of said surfaces sloping radially outwardly in a direction toward the opposite one of said end portions of said pull shaft; whereby when said compressing means and said gripping means move from said extended position to said retracted position, said compressing means surface compressively engages said gripping means surface to cause said gripping means to move radially inwardly against the tube.

3. The apparatus of claim 1 wherein said gripping means includes a plurality of axially extending leg members engageable by said compressing means, whereby said leg members compress against the tube when moved from said extended position to said retracted position.

4. The apparatus of claim 1 wherein said gripping means includes a plurality of tooth-like projections extending radially inwardly, whereby said projections compress against the tube when moved from said extended position to said retracted position.

5. The apparatus of claim 1 wherein said pull shaft includes a collet release member forcibly engageable against said gripping means when moving from said retracted position to said extended position, whereby said gripping means is disengaged from the tube.

6. The apparatus of claim 1 further comprising a retaining means disposed near said extended position for momentarily retaining said collet member at said extended position as said compression member begins to move from said extended position to said retracted position.

7. The apparatus of claim 6 wherein said retaining means includes a plurality of retention members generally peripherally disposed about said collet member and biased radially inwardly, and wherein said collet member includes a catch means for receiving said retention members therein.

8. The apparatus of claim 7 wherein said retention members are generally spherical in shape and said catch means is a groove peripherally disposed in said collet member.

9. The apparatus of claim 1 further comprising a unidirectional check means generally peripherally disposed near said collet member at said extended position and biased radially inwardly for permitting passage therethrough only in a direction from extended position toward said retracted position, whereby a tube being extracted is prevented from moving in a direction from said retracted position toward said extended position.

10. The apparatus of claim 9 further comprising a release means connected to said unidirectional check means for counteracting the radially inwardly biasing thereof, whereby a tube can be moved in a direction from said retracted position towards said extended position.

11. The apparatus of claim 10 wherein said check means includes at least one pawl-like member being spring-biased radially inwardly, said pawl-like member having an arcuately shaped stopping surface adapted for stopping movement of the tube in a direction from said retracted position to said extended position.

12. The apparatus of claim 1 further comprising a second pull shaft being connectable between said one end portion of said first-mentioned pull shaft and said gripping means for axially extending the reach of said gripping means.

13. A tube extracting apparatus adapted for extracting tubes from an enclosure, support member, or the like, comprising:

a generally cylindrical housing having opposite end sections, a pull shaft having opposite end portions and being slidably received in said housing, said pull shaft being reciprocative between an extended position and a retracted position, a compression member being slidably received in said housing and connected to one of said end portions of said pull shaft for reciprocative movement therewith between said extended and said retracted positions, a collet member being slidably received in said housing and disposed with said compression member for reciprocative movement therewith between said extended and said retracted positions, said collet member having an engageable gripping means adapted for gripping radially inwardly against a tube received therein when engaged, said compression member having a compressing means generally peripherally disposed about said gripping means for compressively engaging said gripping means when moving from said extended position to said retracted position and for disengaging said gripping means when moving from said retracted position to said extended position, whereby the tube is gripped and released by said gripping means, a retaining means connected to said housing at said extended position for momentarily retaining said collet member at said extended position as said compression member begins to move from said extended position to said retracted position, thereby ensuring said gripping means securely grips the tube upon engagement thereof, and a unidirectional check means connected to said housing near said extended position and generally peripherally disposed near said collet member at said extended position, said unidirectional check means being biased radially inwardly and adapted for permitting the tube to pass therethrough only in a direction from said extended position toward said retracted position, whereby a tube inserted in said gripping means is continuously extracted by the reciprocative movement of said gripping means between said extended and said retracted positions.

14. The apparatus of claim 13 further comprising a fluid actuating means connected to the other one of said end portions of said pull shaft for reciprocating said pull shaft between said extended and said retracted positions.

15. The apparatus of claim 13 wherein said compressing means includes a radially inwardly facing surface, and said gripping means includes a radially outwardly facing surface, said surfaces being in generally mutually facing relation, one of said surfaces sloping radially outwardly in a direction toward the opposite one of said end portions of said pull shaft; whereby when said compressing means and said gripping means move from said extended position to said retracted position, said compressing means surface compressively engages said gripping means surface to cause said gripping means to move radially inwardly against the tube.

16. The apparatus of claim 13 wherein said gripping means includes a plurality of axially extending leg members engageable by said compressing means, said leg members respectively having a plurality of tooth-like projections extending radially inwardly and adapted for gripping against the tube when moved from said extended position to said retracted position.

17. The apparatus of claim 13 wherein said pull shaft includes a collet release member forcibly engageable against said gripping means when moving from said retracted position to said extended position to ensure disengagement of said gripping means.

18. The apparatus of claim 13 wherein said unidirectional check means includes at least one pawl-like member being spring-biased radially inwardly, said pawl-like member having an arcuately shaped stopping surface adapted for stopping movement of the tube in a direction from said retracted position to said extended position.

19. The apparatus of claim 13 further comprising a release means connected to said check means for counteracting the radially inwardly biasing thereof, whereby a tube can be moved in a direction from said retracted position toward said extended position.

20. The apparatus of claim 13 further comprising a second pull shaft being connectable between said one end portion of said first-mentioned pull shaft and said gripping means for axially extending the reach thereof, and a second generally cylindrical housing connected to said first-mentioned housing and slidably receiving said second pull shaft therein.

* * * * *